Aug. 6, 1946.  S. BLOOMFIELD  2,405,130
SCREW DRIVER
Filed Jan. 19, 1944
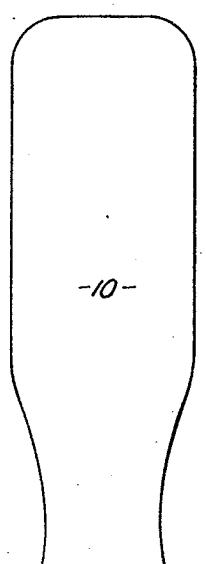
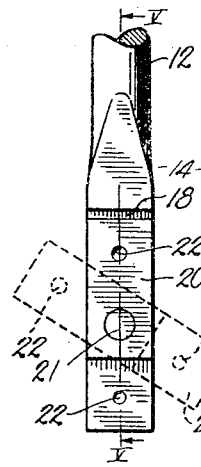
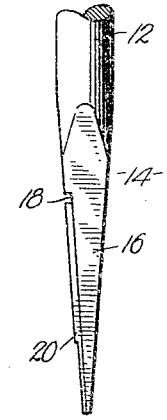
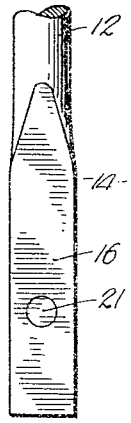
Fig. 2.  Fig. 3.  Fig. 4.
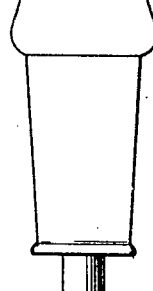
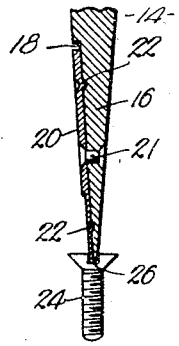
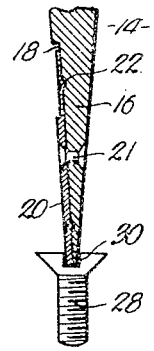
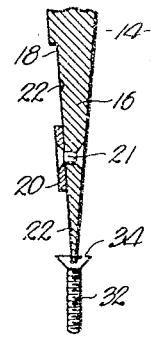
Fig. 5.  Fig. 6.  Fig. 7.
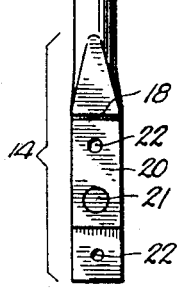
Fig. 1.
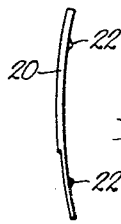
Fig. 8.
INVENTOR.
Samuel Bloomfield
BY
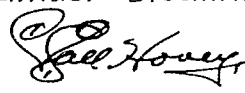
ATTORNEY.

Patented Aug. 6, 1946

2,405,130

UNITED STATES PATENT OFFICE 2,405,130

SCREW DRIVER

Samuel Bloomfield, Wichita, Kans., assignor, by direct and mesne assignments, to C. Earl Hovey, Kansas City, Mo., as trustee Application January 19, 1944, Serial No. 518,793

1 Claim. (Cl. 145—50)

This invention relates to hand tools of the type employed in driving screws or slotted machine screws to position, and the primary aim is the provision of a screw driver having means for varying the effective thickness of the slot-engaging end thereof.

One of the important objects of this invention is to provide a simple, durable and effective structure for altering the thickness of the free end of a screw driver as screw kerfs of different widths are to be engaged.

It is well-known in this art that screw drivers having a blade of given thickness are not efficient when the kerf of the screw is appreciably wider than the thickness of the driver blade. Not only does the screw head become mutilated, but the screw driver itself is often times injured when force is applied to ill-fitting screws and screw driver. It is an object of this invention, therefore, to provide a tool of the aforementioned character, having a multi-section blade portion, one section whereof is shiftable to vary the thickness of the screw driver end.

Other objects of the invention include the manner of mounting the shiftable section in place, the form of said section prior to application, and the manner in which the said section may be disposed to present appropriate blade thicknesses.

In the drawing, illustrating the preferred embodiment of the invention:

Fig. 1 is a side elevational view of a conventional screw driver having a blade made in accordance with the present invention.

Fig. 2 is a side elevational view of that portion of the screw driver having the swingable section thereon.

Fig. 3 is an edge elevational view of a portion of the screw driver.

Fig. 4 is an elevational view of the other side of the screw driver blade.

Fig. 5 is a fragmentary longitudinal sectional view through a portion of the blade taken on line V—V of Fig. 2, and showing one end of the swingable blade section in the operative position.

Fig. 6 is a similar sectional view illustrating the opposite end of the swingable blade section in the operative position.

Fig. 7 is a similar sectional view illustrating the swingable blade section in a position where it is entirely out of engagement with the screw; and Fig. 8 is an edge elevational view of the swingable blade section entirely removed from the operative position.

The screw driver or hand-tool having parts made to embody the instant invention, comprises a conventional handle 10, a shank 12, and a multi-section blade portion generally designated by the numeral 14. This portion is shown in detail in Figs. 2 to 7 inclusive.

Portion 14 includes a fixed blade section 16 integral with shank 12 and preferably slightly offset to present an inclined face 18 against which the movable section 20 is drawn by a rivet or the like 21, serving as the means for pivotally or swingably holding section 20 in place.

Section 20 is formed of spring material and is initially longitudinally arched, as illustrated in Fig. 8, prior to its attachment to fixed section 16.

A pair of detents 22 of like character are formed to hold the sections 16 and 20 against accidental displacement. Each detent 22 comprises a small cavity formed inwardly from inclined face 18 to fixed section 16, and an embossment complementary to each cavity formed outwardly from the face of swingable blade section 20 that lies against face 18.

One end of blade 20 is relatively thin with respect to the opposite end thereof and when screws 24 having kerfs 26 that are narrow enough to receive the thin end of blade 20 and the free end of fixed blade 16 are to be engaged, the swingable blade section 20 is positioned as illustrated in Fig. 5.

Larger screws 28 having kerfs 30 capable of receiving the thick end of section 20 as well as the free end of blade 16, command the use of the tool when it is in a condition shown in Fig. 6. When screws 32 having small kerfs 34 are encountered, the swingable blade section 20 is disposed at an angle to the longitudinal axis of aligned shank and blade 12 and 16 respectively, so that neither end of blade 20 enters the kerf of the screw. Thus, through the medium of the simple structure illustrated, three blade thicknesses may be established.

The opportunity of slipping during manipulation is reduced to a minimum and necessary force may be applied without danger of damage to either the screw or the tool.

Obviously, various ways of forming and assembling the parts embodying the broad concepts of this invention, may be made without departing from the scope of the appended claim.

Having thus described the invention, what is claimed as new and desired to be secured by Letters Patent is:

In a screw driver of the character described, a blade portion comprising a fixed section having its free end tapered to enter the kerf of a screw; a movable section pivotally mounted intermediate its ends on the fixed section and adapted to have either of its ends in superimposed relation with the free end of the fixed section; and means for yieldably holding the movable section in position with either of its ends in said superimposed relation with the fixed section, the ends of said movable section being of different thickness.

SAMUEL BLOOMFIELD.